US008985804B2

(12) United States Patent
Frazier

(10) Patent No.: US 8,985,804 B2
(45) Date of Patent: Mar. 24, 2015

(54) TACTICAL FLASHLIGHT AND ACCESSORY

(76) Inventor: Andrew G. C. Frazier, Sunnyvale, CA (US)

(*) Notice: Subject to any disclaimer, the term of this patent is extended or adjusted under 35 U.S.C. 154(b) by 215 days.

(21) Appl. No.: 13/598,009

(22) Filed: Aug. 29, 2012

(65) Prior Publication Data

US 2014/0063791 A1 Mar. 6, 2014

(51) Int. Cl.

| | |
|---|---|
| ***F41G 1/34*** | (2006.01) |
| ***F21L 4/00*** | (2006.01) |
| ***H04M 1/22*** | (2006.01) |
| ***F41G 1/00*** | (2006.01) |
| ***F41G 3/00*** | (2006.01) |
| ***F41G 11/00*** | (2006.01) |
| ***F41G 1/35*** | (2006.01) |

(52) U.S. Cl.
CPC ... *F21L 4/00* (2013.01); *F41G 3/00* (2013.01); *F41G 11/003* (2013.01); *F41G 1/35* (2013.01)
USPC ........... 362/110; 362/113; 362/191; 362/208; 42/146

(58) Field of Classification Search
CPC ... F41G 11/001; F41G 11/003; F41G 11/004; F41G 3/145; F41G 1/34; F41G 1/345; F41G 1/35; F41G 1/36; F41C 33/0254; F41C 27/00
USPC ......... 362/109, 110, 113, 190, 191, 197, 208; 42/146
See application file for complete search history.

(56) References Cited

U.S. PATENT DOCUMENTS

| | | | |
|---|---|---|---|
| 4,758,933 A | 7/1988 | Winberg | |
| 5,040,322 A | 8/1991 | Iturrey, Jr. | |
| 5,642,932 A | 7/1997 | Matthews | |
| 5,816,683 A * | 10/1998 | Christiansen | 362/110 |
| 5,848,834 A | 12/1998 | Kerr | |
| 6,222,138 B1 | 4/2001 | Matthews | |
| 6,641,277 B2 | 11/2003 | Smith | |
| 7,303,306 B2 | 12/2007 | Ross | |
| 7,334,366 B2 * | 2/2008 | La France | 42/146 |
| 7,399,100 B1 | 7/2008 | Plyaskin | |
| 7,722,209 B2 | 5/2010 | Matthews | |
| 7,735,255 B1 * | 6/2010 | Kincaid et al. | 42/146 |
| 7,736,013 B2 * | 6/2010 | Griffin | 362/110 |
| 7,857,480 B2 * | 12/2010 | Steele et al. | 362/197 |
| 8,075,156 B2 | 12/2011 | Steele | |
| 8,087,795 B2 | 1/2012 | D'mato | |
| 2007/0228754 A1 | 10/2007 | Rankin | |
| 2009/0009987 A1 | 1/2009 | Graham | |

* cited by examiner

*Primary Examiner* — Robert May
*Assistant Examiner* — Alexander Garlen
(74) *Attorney, Agent, or Firm* — Trop, Pruner & Hu, P.C.

(57) ABSTRACT

In some embodiments, a flashlight may include a tubular body and a finger rotation feature disposed on the tubular body. In other embodiments, a flashlight accessory may include a flashlight connector to removably attach to a flashlight, a finger rotation feature, and a finger trigger to activate the flashlight.

26 Claims, 21 Drawing Sheets

TACTICAL FLASHLIGHT AND ACCESSORY

BACKGROUND

Embodiments relate generally to a flashlight and/or flashlight accessory for use alone or in conjunction with a firearm.

Conventionally, employing a firearm along with a light source by military, law enforcement, and authorized citizens has required using either tactics or technique. For example, a user may utilize specialized two-hand grip techniques in order to hold both a flashlight and a firearm at the same time. In another example, a light source may be mounted directly to the weapon.

DETAILED DESCRIPTION

Figure 1:
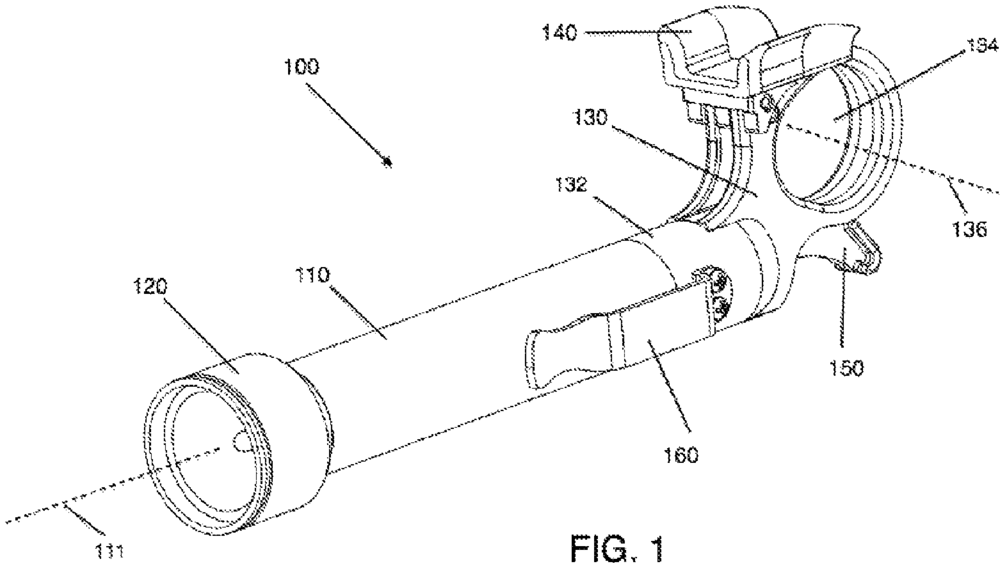
FIG. 1 shows a perspective view of a flashlight in accordance with one or more embodiments.
Figure 2:
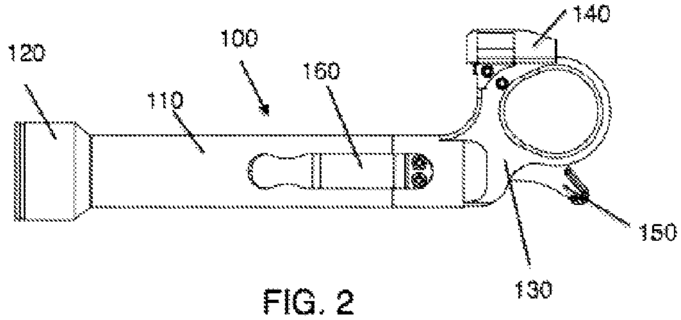
FIG. 2 shows a side view of a flashlight in accordance with one or more embodiments.
Figure 3:
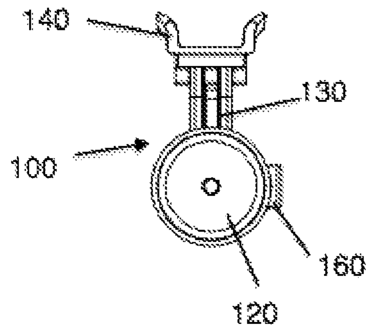
FIG. 3 shows a front view of a flashlight in accordance with one or more embodiments.
Figure 4:
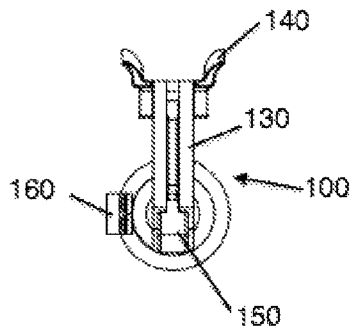
FIG. 4 shows a back view of a flashlight in accordance with one or more embodiments.
Figure 5:
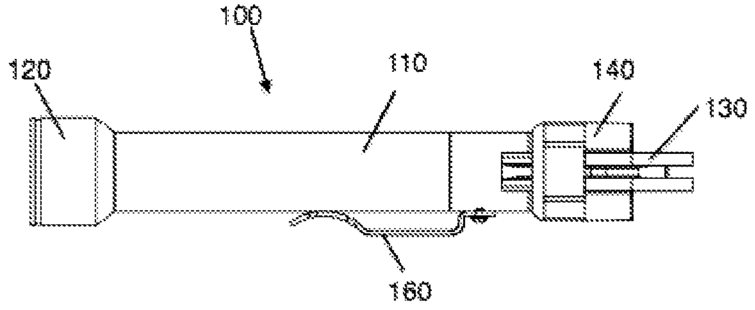
FIG. 5 shows a top view of a flashlight in accordance with one or more embodiments.

Conventionally, the simultaneous use of a flashlight and a firearm has required specialized techniques. For example, such techniques may require the user to hold the flashlight in one hand, while operating the handgun with the other. This one-handed grip significantly reduces the ability of the user to align the sights, manage recoil, and adopt a stable stance with the firearm. Other techniques may cause users to modify their trained shooting habits, and/or may misalign the axis of the flashlight's beam with the axis of the sights/barrel of the firearm. Such misalignment may cause the user's eyes to be drawn to two different focal points; the firearm sights/bore axis, and the center of the flashlight beam. Under stress, the confusion caused by this misalignment can compromise accuracy.

Embodiments may enable a flashlight to be deployed quickly from a users pocket or belt and held in two different orientations. The first orientation may provide a natural flashlight grip for general illumination, and may also enable the flashlight to be used as a defensive punching-based impact weapon. The second orientation may allow the user to align the flashlight with a firearm and illuminate a target while adopting a non-compromised two-handed shooting grip. Further, the user may retain the flashlight while manipulating objects with the same hand by allowing the flashlight to hang off the finger.

In addition, in one or more embodiments, a flashlight attachment may be removably attached to an existing flashlight having a tubular body, and may be configured to removably mount to a firearm. In some embodiments, the flashlight attachment may include an alignment feature to align the flashlight's light beam axis with the bore axis of the firearm. Further, in some embodiments, the flashlight attachment may include an offset finger retention feature and a mechanism for actuating a tail switch of the flashlight.

Referring to FIGS. 1-6, shown is a flashlight 100 in accordance with one or more embodiments. In some embodiments, the flashlight 100 may include a lamp assembly 120 disposed at one end of a tubular body 110, and a finger retention housing 130 disposed at an opposite end of the tubular body 110. Further, in some embodiments, the finger retention housing 130 may be offset from a longitudinal axis 111 of the tubular body 110. In addition, in one or more embodiments, the flashlight 100 may also include an alignment feature 140, a finger switch 150, and a spring clip 160. In some embodiments, the flashlight 100 may include any type of material or combination of materials, such as metals (e.g., iron, steel, aluminum, etc.), plastics (e.g., polymers, elastomers, etc.), woods, ceramics, composites, etc.

In one or more embodiments, the tubular body 110 may provide housing for a battery (or batteries) used to power the lamp assembly 120. In some embodiments, the tubular body 110 may act as an electrical connection between the lamp assembly 120 and the finger switch 150. Accordingly, in some embodiments, the tubular body 110 may include conductive materials (e.g., aluminum alloy or steel, etc.) and/or insulating materials (polycarbonate, rubber, silicone, etc.).

In one or more embodiments, the finger retention housing 130 may include an end cap 132 to cap one end of the tubular body 110. In some embodiments, the end cap 132 may be attached to the tubular body 110 using any type of detachable connection (e.g., a screw thread connection, a snap-fit connection, a ring and groove connection, etc.). In other embodiments, the end cap 132 may be permanently connected to the tubular body 110 (e.g., a glue connection, a welded connection, etc.). Alternatively, in some embodiments, the finger retention housing 130 and the tubular body 110 may be a single continuous piece.

In one or more embodiments, the finger retention housing 130 may include an opening 134 configured to accept a user's finger (or fingers) for retention and positioning of the flashlight 100 in the user's hand. In some embodiments, a central axis 136 of the opening 134 may be substantially perpendicular to the longitudinal axis 111 of the tubular body 110. Further, in some embodiments, the interior surface of the opening 134 may be configured to enable the user to rotate the finger retention housing 130 smoothly around the user's finger (or fingers). In this manner, the user may quickly rotate the flashlight 100 around the central axis 136 of the opening 134, and thereby change the orientation of the flashlight 100. Accordingly, the finger retention housing 130 may function as a finger rotation feature for the flashlight 100. Such rotation of the flashlight 100 is described further below with reference to FIGS. 10-14.

Figure 33:
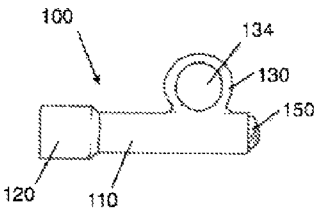
FIG. 33 shows a side view of a flashlight in accordance with one or more embodiments.
Figure 34:
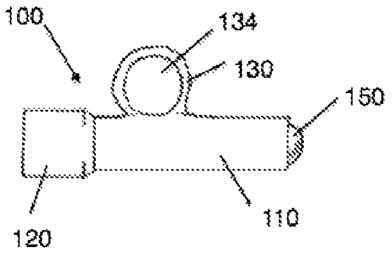
FIGS. 34, 35, and 36 show side views of flashlights in accordance with some embodiments.
Figure 35:
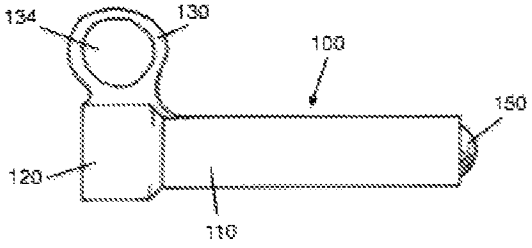
Figure 36:
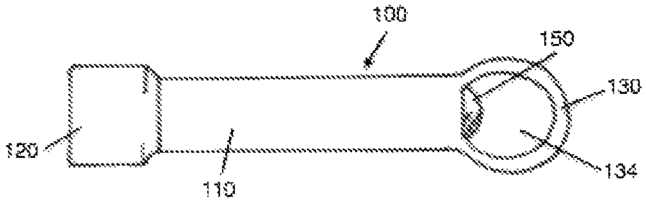

In one or more embodiments, the finger retention housing 130 may be positioned in any location on the flashlight 100. For example, as shown in FIG. 33, the finger retention housing 130 may be disposed at an end distal from the lamp assembly 120, and offset from the longitudinal axis 111. In another example, as shown in FIG. 34, the finger retention housing 130 may be disposed approximately at a midpoint of the flashlight 100. In yet another example, as shown in FIG. 35, the finger retention housing 130 may be disposed at the same end as the lamp assembly 120. In still another example, as shown in FIG. 36, the finger retention housing 130 may be disposed at a distal end from the lamp assembly 120, and aligned with the longitudinal axis 111. Of course, these examples are not limiting, and it is contemplated that the finger retention housing 130 may be disposed anywhere on the flashlight 100. Further, it is contemplated that the finger switch 150 may also be disposed on any other location on the flashlight 100.

In one or more embodiments, the finger retention housing 130 may include one or more rigid and/or flexible materials, such as plastics (e.g., polycarbonate, nylon, polymer, etc.), metals (e.g., aluminum, steel, etc.), wood, glass, rubber, composites, and/or any combination thereof. For example, in some embodiments, the finger retention housing 130 may be formed from a polycarbonate body with an elastomeric over-molded material. The over-molded material may provide a comfortable and secure grip for the user that conforms to the fingers during use.

In one or more embodiments, the finger switch 150 may function to activate (i.e., to turn on or off) the flashlight in response to finger pressure. In some embodiments, the switch 150 may be configured to convert finger pressure into a substantially linear force. The resulting linear force may be defined the operational axis of the finger switch 150. Further, in some embodiments, the operational axis of the finger switch may be substantially parallel to a longitudinal axis 111 of the tubular body 110.

Figure 6:
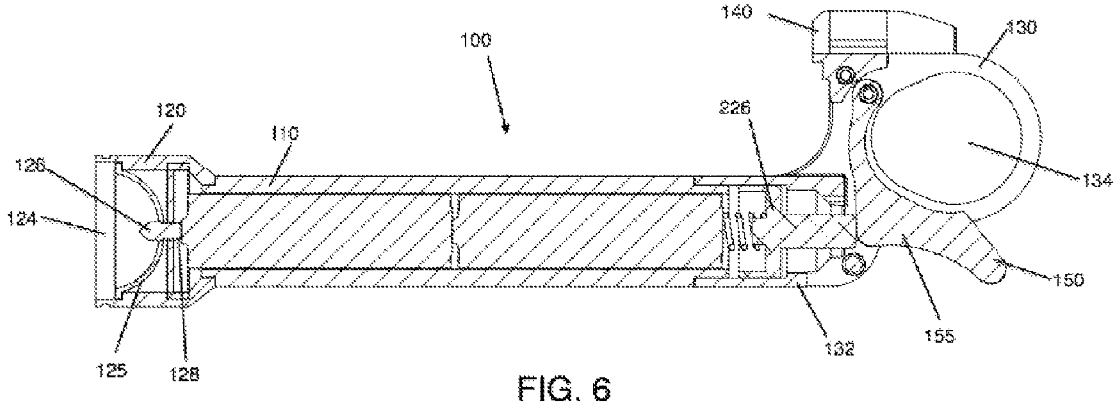
FIG. 6 shows a section view of a flashlight in accordance with one or more embodiments.

Referring to FIG. 6, in one or more embodiments, the finger switch 150 may include a hinged lever 155. As shown, in some embodiments, the hinged lever 155 may be attached by a hinge to the finger retention housing 130. The finger switch 150 may be oriented such that, when a user applies finger pressure to the hinged lever 155, an electrical circuit is closed and the lamp assembly 120 is powered. Further, when the user stops applying pressure to the hinged lever 155, an internal spring may open the electrical circuit, thereby cutting power to the lamp assembly 120. The finger switch 150 may be comprised of any materials such as, but not limited to, steel, aluminum, polycarbonate, nylon, and combinations of materials such as polymers with elastomeric over-molding.

In one or more embodiments, the alignment feature 140 may function to removably attach the flashlight 100 to a firearm. In some embodiments, the alignment feature 140 may also function to align the flashlight 100 with the firearm. For example, such alignment may result in the aim of the flashlight matching the aim of the firearm. In another example, such alignment may result in the longitudinal axis 111 of the flashlight ("beam axis") being substantially parallel to the longitudinal axis of the firearm ("bore axis"). In yet another example, such alignment may result in the beam axis being at a preferred angle to the bore axis. In some embodiments, the alignment feature 140 may include a pivot or hinge to enable the angle between the beam axis and the bore axis to be selectively adjusted.

In one or more embodiments, the alignment feature 140 may be disposed on the finger retention housing 130. In some embodiments, the alignment feature 140 may be disposed on a portion of the finger retention housing 130 that is substantially distal from the longitudinal axis 111 of the tubular body 110.

In some embodiments, the alignment feature 140 may be configured to slideably engage a portion of the firearm. For example, as shown in FIGS. 1-5, the alignment feature 140 may be a slide coupler having a U-shaped cross section configured to slide over and engage a corresponding portion of a firearm. For example, such a slide coupler may engage a bottom portion of a handgun trigger guard, a "picatinny" rail system of a rifle, etc. In some embodiments, the width of such slide couplers may gradually narrow, such that friction between the slide coupler and the corresponding portion of the firearm increases as the two elements are coupled. In this manner, the alignment feature 140 may function to rigidly but removably attach the finger retention housing 130 to the firearm.

Figure 18:
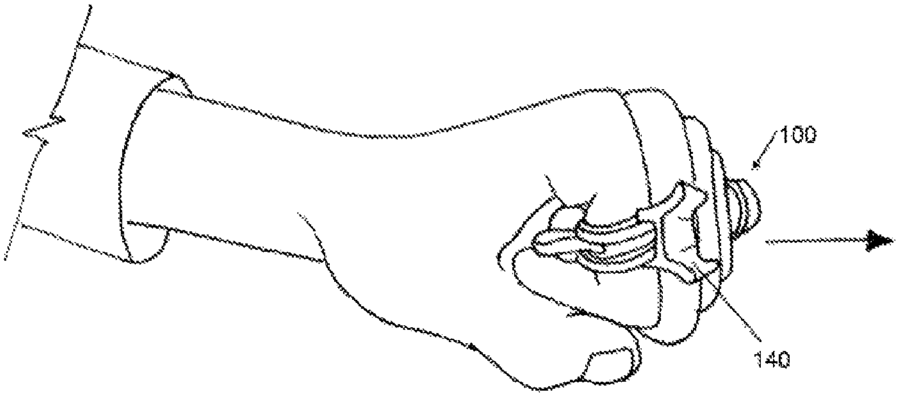

In some embodiments, the alignment feature 140 shown in FIGS. 1-5 may be utilized as a striking weapon when the flashlight 100 is not attached to a firearm. For example, as shown in FIG. 18, the flashlight 100 may be held such that the alignment feature 140 functions as a striking surface. In such embodiments, the alignment feature 140 may be comprised of rigid materials (e.g., steel, aluminum, etc.), flexible or semi-flexible materials (e.g., polymers, elastomers, etc.), or any combination (e.g., an elastomeric saddle with metal rails insert-molded into its sides). Further, the alignment feature 140 may be adjustably attached to the finger retention housing 130 using any permanent or detachable connection(s) (e.g., threaded or snap-fit connections, glue connections, welded connections, screws, spring pins, rivets, etc.). Optionally, the alignment feature 140 and the finger retention housing 130 may be a single integral piece.

Figure 19:
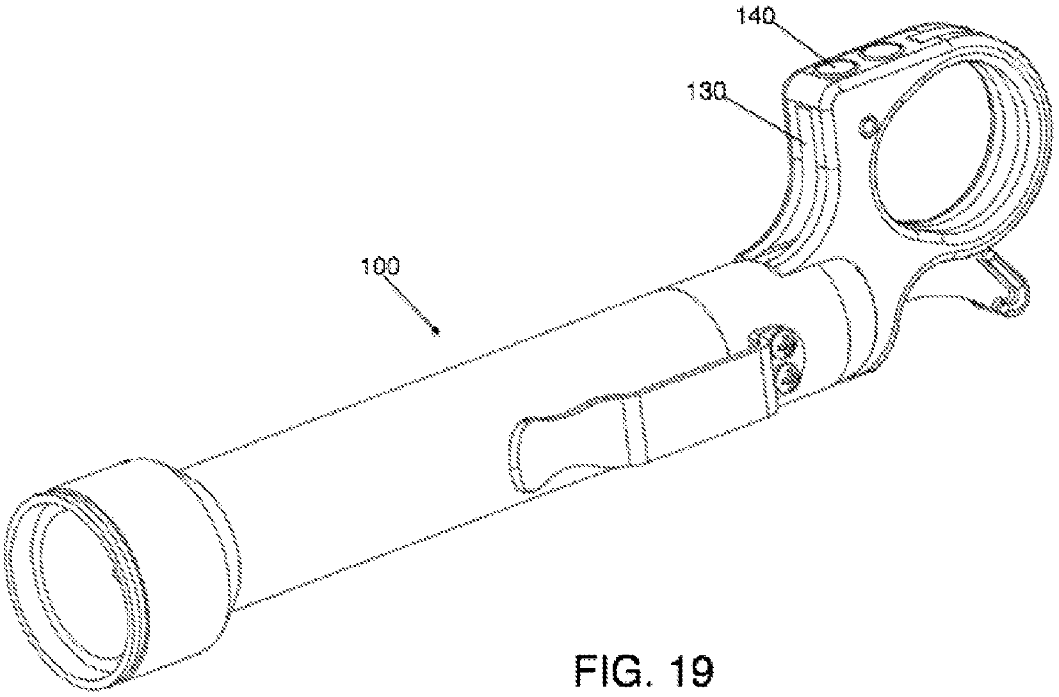
FIG. 19 shows a perspective view of a flashlight in accordance with one or more embodiments.
Figure 20:
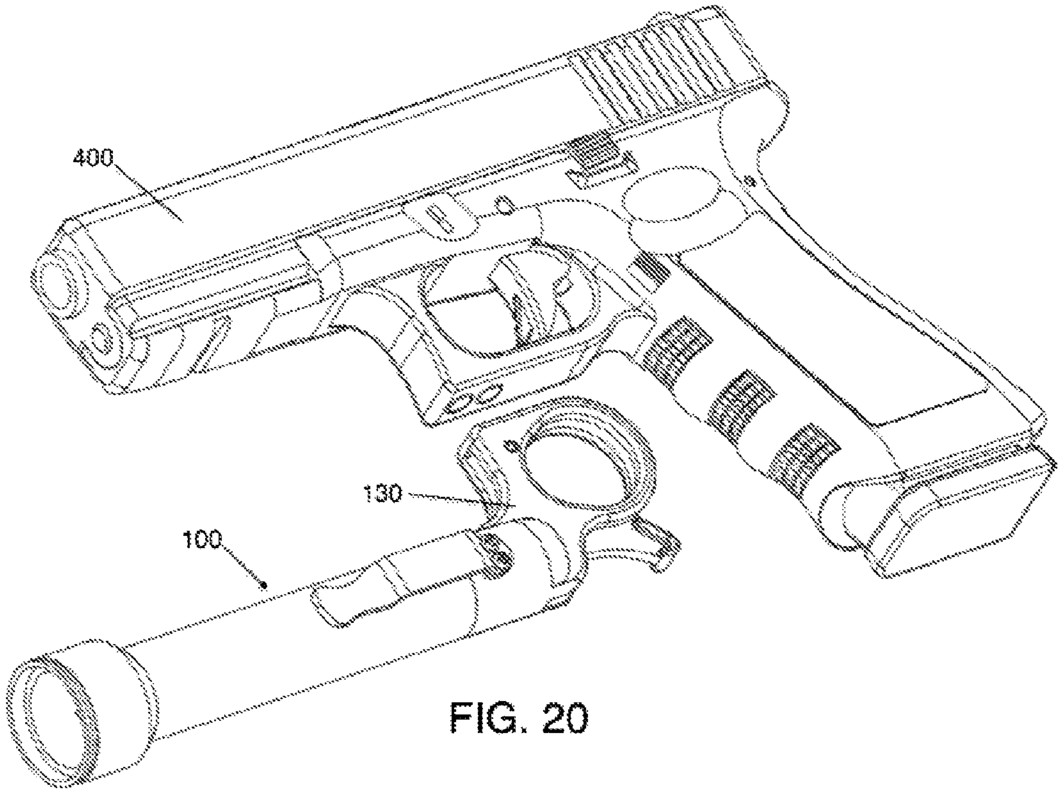
FIG. 20 shows a perspective view of a handgun and a flashlight in accordance with one or more embodiments.
Figure 21:
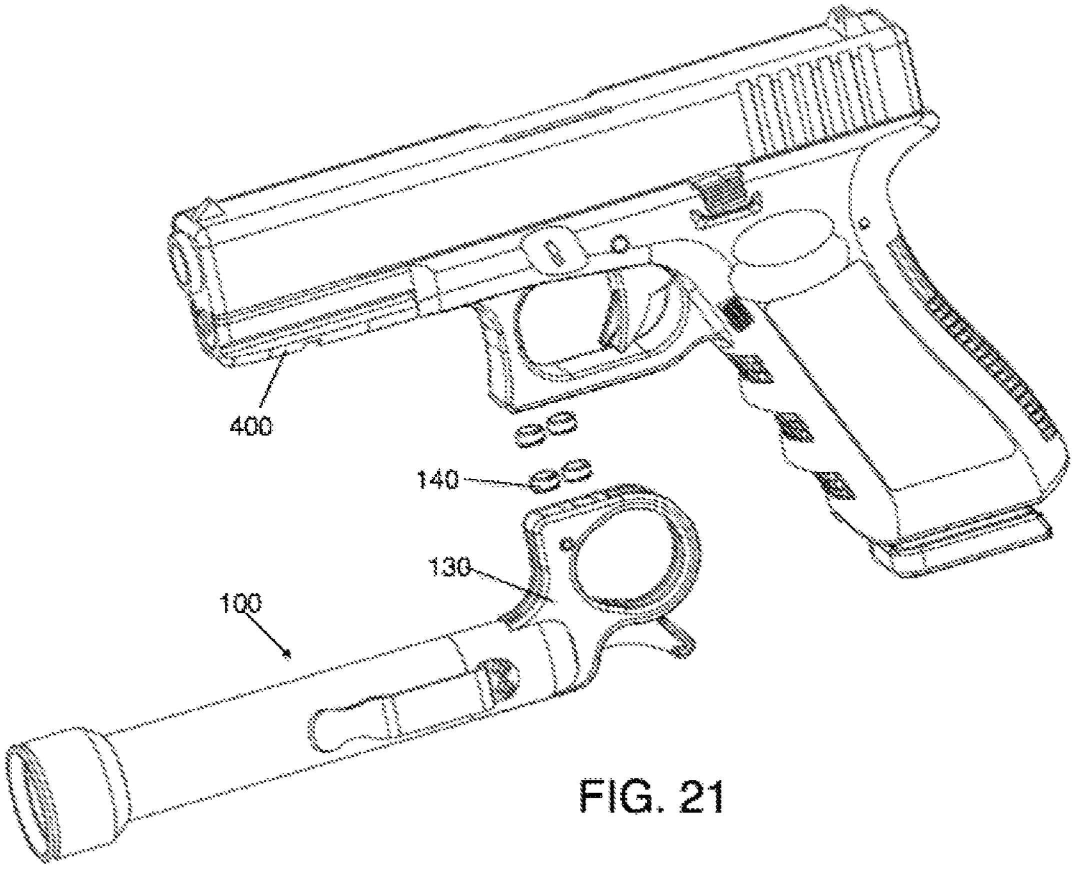
FIG. 21 shows an exploded view of a handgun and a flashlight in accordance with one or more embodiments.

In some embodiments, the alignment feature 140 may be configured to magnetically attach to the firearm. For example, as shown in FIGS. 19-21, the alignment feature 140 may include a pair of magnets disposed on the finger retention housing 130. Each magnet of this pair is separately polarized and oriented, such that a first magnet in the pair is polarized opposite the second magnet in the pair. Further, this pair of magnets may be arranged to attach to a corresponding pair of magnets disposed on the firearm (e.g., a bottom portion of a handgun trigger guard, a bottom portion of a rifle barrel, etc.). By matching the polarity of each magnet appropriately, the magnets in the finger retention housing 130 will be attracted to the corresponding magnets of the firearm, thereby aligning the flashlight 100 to the firearm. The user can decouple the flashlight 100 and the firearm by sliding the flashlight 100 laterally, thereby causing the magnetic attraction to be reduced. In some embodiments, the magnets of the alignment feature 140 may be, e.g., permanent magnets, electromagnets, etc.

Note that the alignment features 140 shown in FIGS. 1-5 and 19-21 are provided by way of example, and are not intended to be limiting. It is contemplated that the alignment feature 140 may use other attachment devices or techniques. For example, the alignment feature 140 may be a V-shape slide coupler, a concave slide coupler where one side is taller and/or longer than the opposite side, flexible fingers or projections, clamps, rails, grooves, clips, pins, holes, snaps, locks, screws, friction connections, cams, etc. In another example, the alignment feature 140 may include any number or arrangement of magnets or similar components.

In one or more embodiments, the spring clip 160 may enable the flashlight 100 to be attached to the opening of a pocket, a belt, a tactical vest, or many other locations that allow accessible retention of the light during activities. The spring clip 160 may be attached to the tubular body 110, or may be an integrated feature of the tubular body 110 or the finger retention housing 130. Further, the orientation of the spring clip 160 may be parallel to the longitudinal axis 111 of the flashlight 100 with its opening nearest the lamp assembly 120 (as shown in FIG. 1-5), or may be oriented such that its opening is nearest to the opening 134. The side of the flashlight 100 to which the spring clip 160 is attached may also be changed to allow users to orient the flashlight 100 as desired.

As shown in FIG. 6, the lamp assembly 120 may include a housing 122, lens 124, reflector 125, lamp 126, and electrical contacts 128. When the lamp 126 is activated via the electrical contacts with the battery (or batteries), the light emitted is reflected and focused by the reflector 125, and is then projected through the lens 124. The lamp 126 may be, e.g., one or more light emitting diodes (LEDs), incandescent bulb(s), etc. The electrical contacts 128 may be conductors to allow current to flow from the battery (or batteries) to the other electrical components. The lamp assembly 120 may also include other components (not shown), such as current regulating circuitry, alternate modes (low intensity, high intensity light), reverse polarization protection, etc.

Figure 24A:
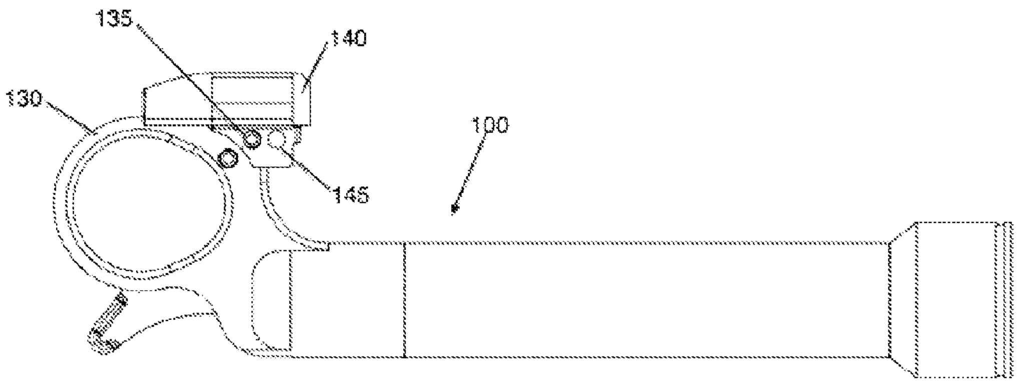
FIG. 24A shows a side view of a flashlight in accordance with one or more embodiments.
Figure 24B:
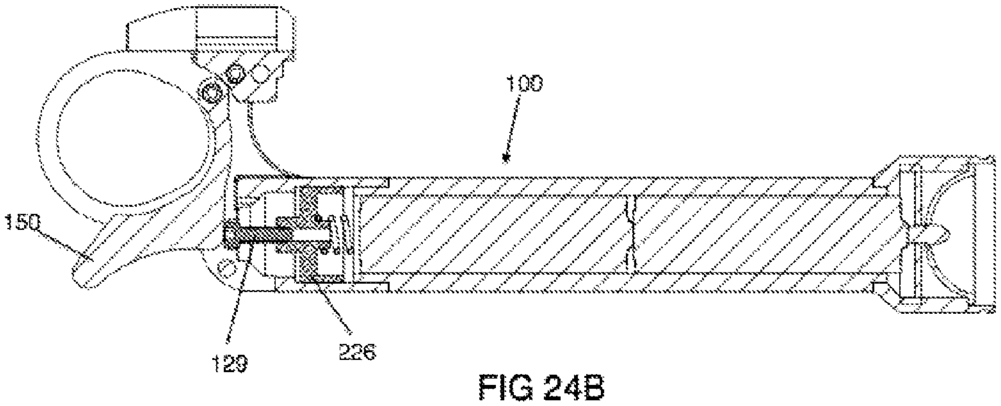
FIG. 24B shows a section view of a flashlight in accordance with one or more embodiments.

In some embodiments, the alignment feature 140 and finger switch 150 can be adjusted to fit a user's hand. Such adjustments may allow the user to employ the flashlight 100 while wearing gloves. For example, FIG. 24A shows the flashlight 100 including an alignment feature 140 with mounting hole(s) 145, and a finger retention housing 130 with a mounting hole 135. In such embodiments, the position of the alignment feature 140 may be adjusted by moving the alignment feature 140 until a mounting hole 145 is concentric with the mounting hole 135 of the finger retention housing 130, and then locking the position using a spring pin. Utilizing a different mounting hole 145 in the alignment feature 140 would thus adjust the position of the alignment feature 140 relative to the finger retention housing 130. Other adjustment mechanisms are contemplated such as set screws, ratcheting mechanisms, etc. Referring to FIG. 24B, an adjustment screw 129 may enable the finger switch 150 to be adjusted to suit a user's hand.

Figure 22:
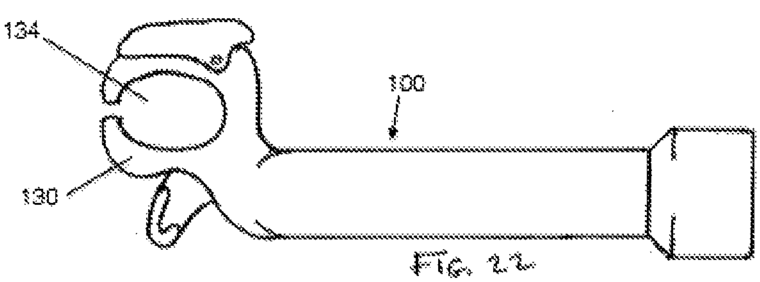
FIG. 22 shows a side view of a flashlight in accordance with one or more embodiments.
Figure 23:
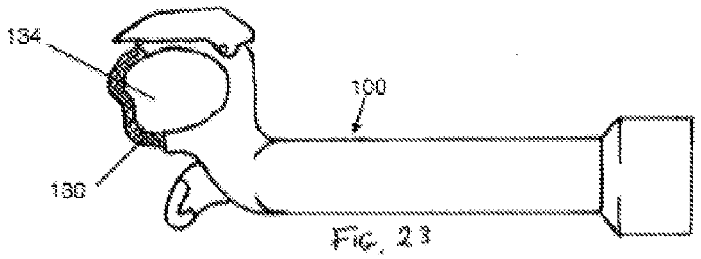
FIG. 23 shows a side view of a flashlight in accordance with one or more embodiments.

Referring to FIGS. 22-23, alternative embodiments of the opening 134 are contemplated. For example, as shown in FIG. 22, the opening 134 may include a partial gap to allow disengagement of the finger from the flashlight 100 in the situation that flashlight 100 is caught or pulled in a manner that could injure the user. In another example, as shown in FIG. 23, the finger retention housing 130 may be formed of a flexible or semi-flexible material. Such a flexible opening 134 may deform during use, resulting in a conformal, comfortable contact between the fingers of the left and right hands during firearm operation with a normal two-handed grip.

Figure 25A:
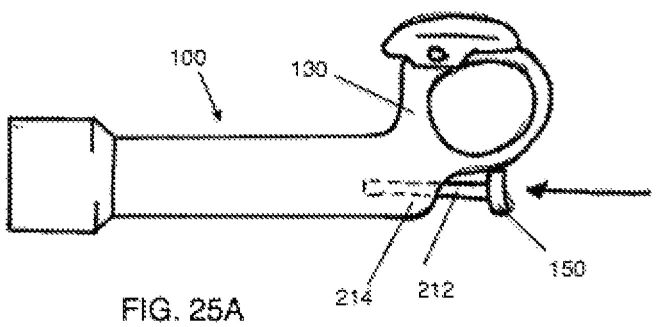
FIG. 25A shows a side view of a switch mechanism in accordance with one or more embodiments.
Figure 25B:
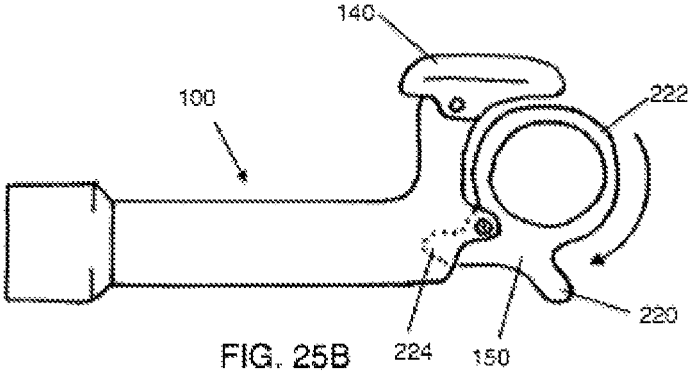
FIG. 25B shows a side view of a switch mechanism in accordance with one or more embodiments.
Figure 26:
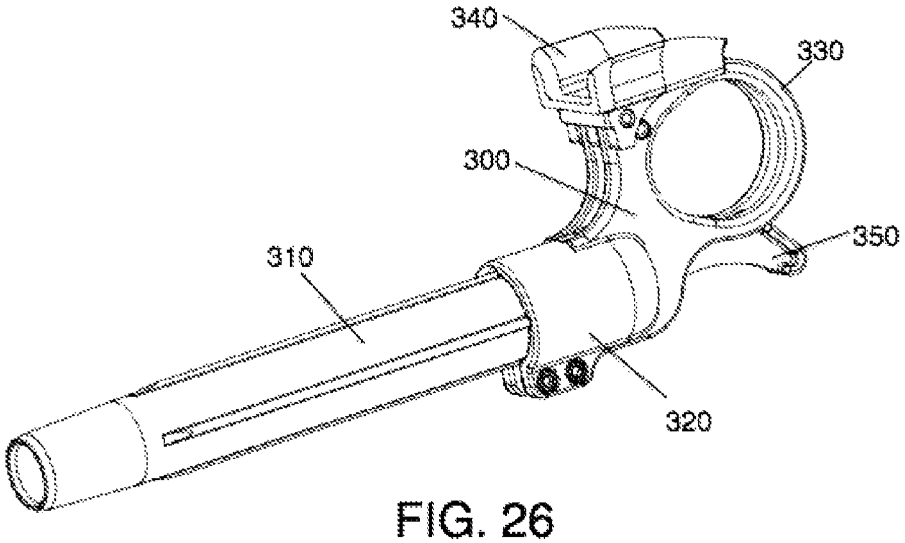
FIG. 26 shows a perspective view of a flashlight attachment device in accordance with one or more embodiments.

Example alternative embodiments of the finger switch 150 are shown in FIGS. 25A-25B. Referring to FIG. 25A, in some embodiments, the finger switch 150 may be a linear plunger mechanism which acts on the spring-loaded conductor 210 by way of a plunger shaft 212 sliding through a bushing 214 at the proximal end of the finger retention housing 130.

Referring to FIG. 25B, in some embodiments, the finger switch 150 may include a switch pad 220 rigidly mounted to a pivoting finger ring 222. The user may apply force to the switch pad 220 relative to the body of the flashlight 100, thus causing a protrusion 224 on the pivoting finger ring 222 to act upon the spring-loaded conductor 226, thereby activating the flashlight 100. In such embodiments, the alignment feature 140 may be rigidly connected to the body of the flashlight in order to provide counter-traction when used with a firearm.

Referring now to FIGS. 26-31, shown is a flashlight accessory 300 configured to be removably mounted to a conventional flashlight (e.g., a typical flashlight having a tubular body with a lens assembly at one end and a tail cap switch on the opposite end, and not including the above-described elements of flashlight 100), in accordance with some embodiments. When mounted to a conventional flashlight, the flashlight accessory 300 may provide the conventional flashlight with some or all of the functionality of the flashlight 100 described above with reference to FIGS. 1-6, 18-23, 24A-24B, and 25A-25B.

Figure 27:
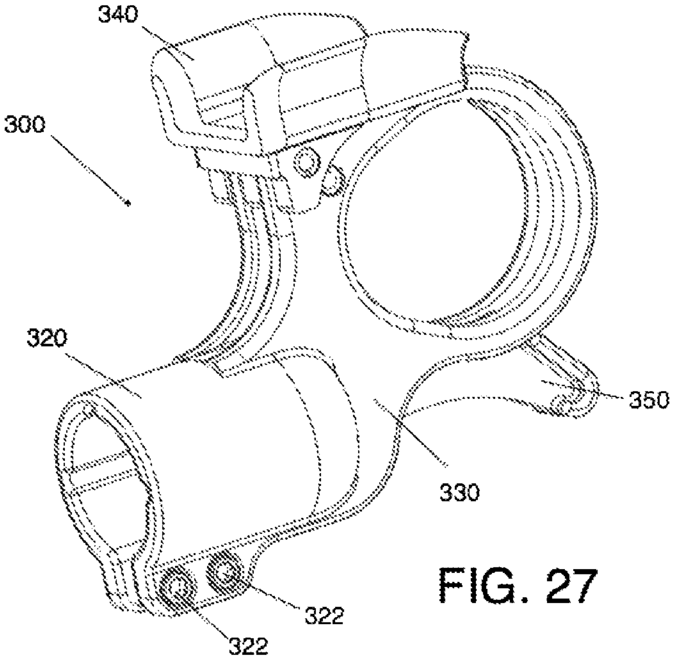
FIG. 27 shows a perspective view of a flashlight attachment device in accordance with one or more embodiments.
Figure 28:
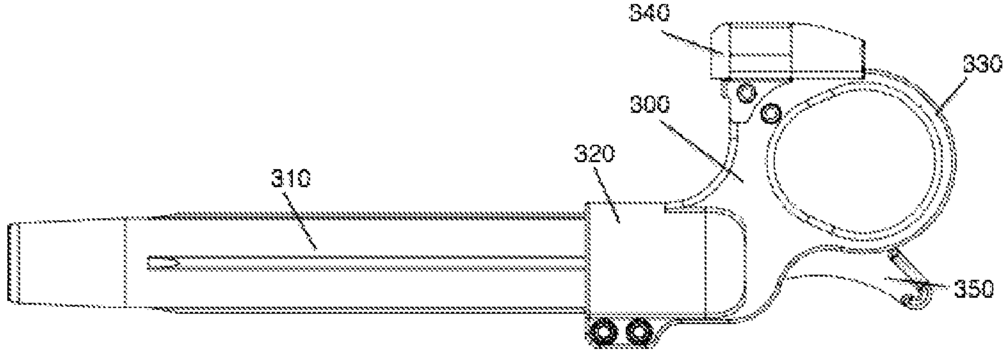
FIG. 28 shows a side view of a flashlight attachment device in accordance with one or more embodiments.
Figure 29:
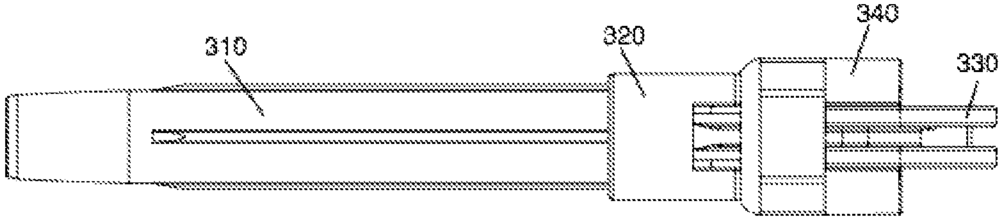
FIG. 29 shows a top view of a flashlight attachment device in accordance with one or more embodiments.
Figure 30:
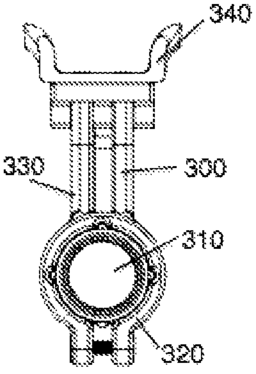
FIG. 30 shows a front view of a flashlight attachment device in accordance with one or more embodiments.

FIGS. 26 and 28-31 show the flashlight accessory 300 as attached to a conventional flashlight 310. Further, for the sake of clarity, FIG. 27 shows the flashlight accessory 300 alone (i.e., not attached to a conventional flashlight). As shown, in some embodiments, the flashlight accessory 300 may include a flashlight connector 320, a finger retention housing 330, an alignment feature 340, and/or a finger switch 350. In some embodiments, the flashlight accessory 300 may include any type of material or combination of materials, such as metals (e.g., iron, steel, aluminum, etc.), plastics (e.g., polymers, elastomers, etc.), woods, ceramics, composites, etc.

In one or more embodiments, the flashlight connector 320 may function to removably attach the flashlight accessory 300 to a conventional flashlight 310. For example, referring to FIG. 27, the flashlight connector 320 may be a flexible collar that can be tightened into place by two helical screws 322 engaged in helical nuts (not shown). In another example, the flashlight connector may be a flexible annular ring (not shown) that attaches to a conventional flashlight via a friction fit. Note that these examples of the flashlight connector 320 are not limiting, and any type of flashlight attachment mechanism or technique is contemplated.

Figure 31:
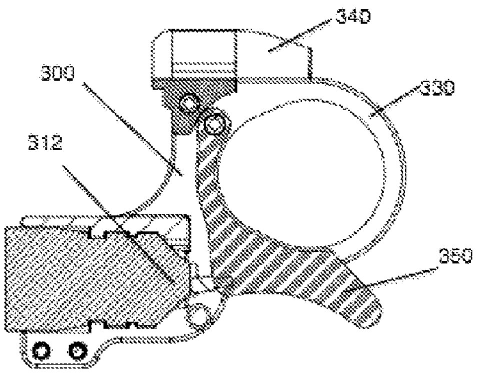
FIG. 31 shows a partial section view of a flashlight attachment device in accordance with one or more embodiments.

In one or more embodiments, the finger retention housing 330 may be offset from a longitudinal axis of the conventional flashlight 310 when the conventional flashlight 310 is attached to the flashlight accessory 300. Further, as shown in FIG. 31, the flashlight accessory 300 may be positioned on the conventional flashlight 310 such that the finger switch 350 is able to engage the tail cap switch 312 on the conventional flashlight 310. When depressed by the user, the finger switch 350 applies pressure upon the tail cap switch 312, thereby activating the conventional flashlight 310. Further, if the user releases pressure on the finger switch 350, the spring force of the tail cap switch 312 deactivates the light.

In some embodiments, the finger switch 350 may use alternative switching mechanisms, for example linear plungers and pivot finger rings similar to those described above with reference to FIGS. 25A-25B. Further, in some embodiments, the flashlight accessory 300 may use alternate alignment features as shown in FIGS. 19-21, and finger retention features as shown in FIGS. 22-23 can be incorporated into the flashlight attachment device.

Referring again to FIG. 27, in some embodiments, the alignment feature 340 of the flashlight accessory 300 may be similar to the alignment feature 140 of flashlight 100 discussed above with reference to FIGS. 1-5. For example, the alignment feature 340 may be a slide coupler, a magnet-based coupler, or any other type of mechanism to attach and align a firearm to the flashlight accessory 300, and thereby align the firearm to conventional flashlight 310. Further, the finger retention housing 330 may include any type of finger opening, (e.g., openings similar to those shown in FIGS. 22-23).

FIGS. 7-18 illustrate various methods for carrying, deploying, and operating the flashlight 100 described above, in accordance with some embodiments. Note that, while FIGS. 7-18 only show flashlight 100, the same (or similar) methods may also apply to the flashlight accessory 300 described above.

Figure 7:
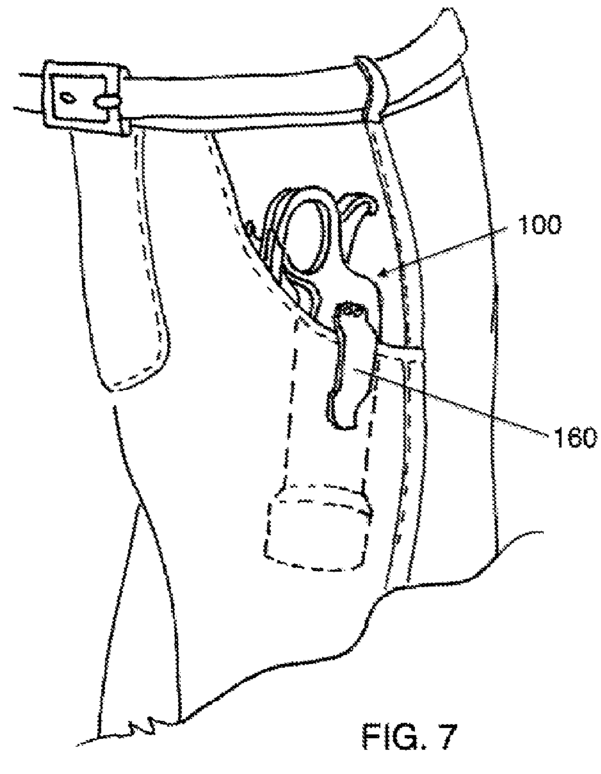
FIGS. 7-14 show examples to illustrate one or more embodiments.

FIG. 7 shows the flashlight 100 attached by way of the spring clip 160 to the opening of a pants pocket, in accordance with some embodiments. This arrangement provides an accessible, yet discreet carrying position for the user. Alternately, the spring clip 160 can be used to attach the flashlight 100 to a belt, jacket pocket, or many other locations as desired by the user. Furthermore, the flashlight 100 may be retained on the user's body by way of a holster that releasably engages or retains any other part of the flashlight 100.

Figure 8:
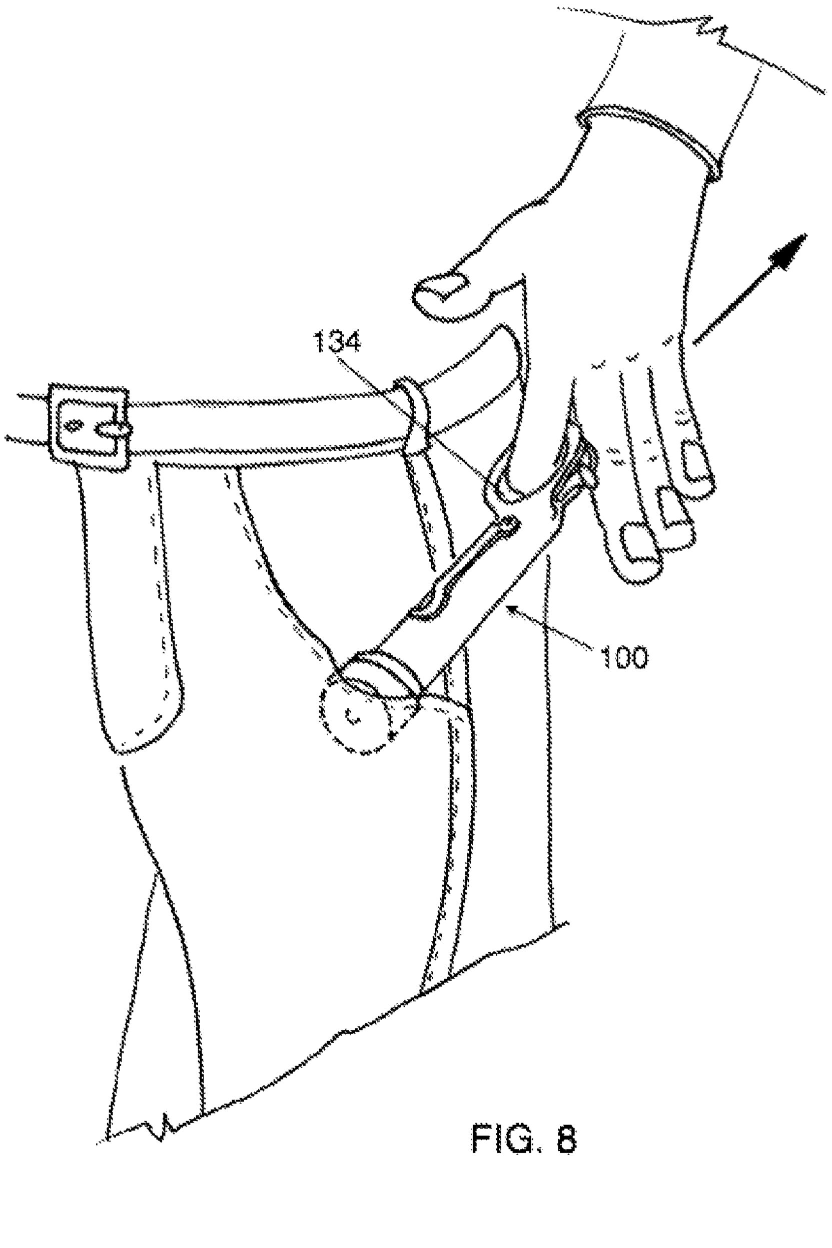
Figure 9:
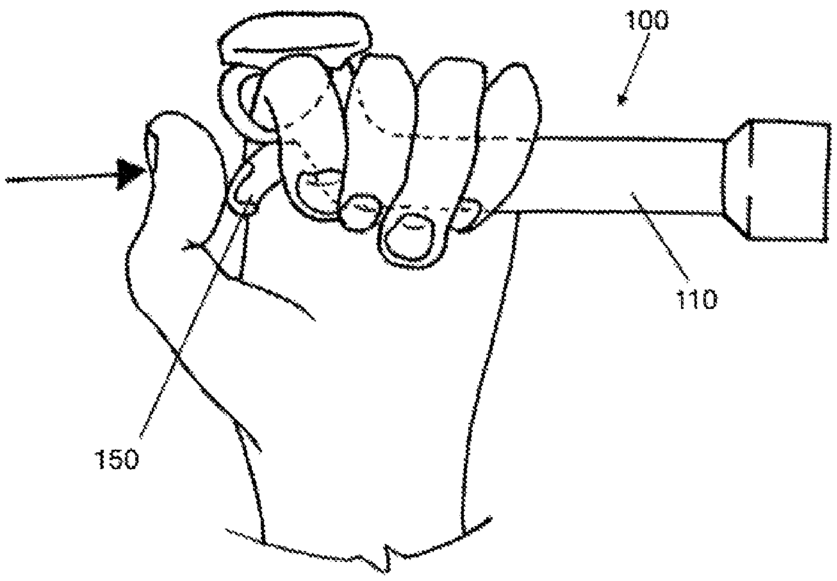

FIG. 8 shows the user inserting the left index finger into the opening 134 and pulling the flashlight 100 out of the pocket, in accordance with some embodiments. This action may index the features of the flashlight 100 relative to the user's hand. The user can then grasp the tubular body 110 with the remaining fingers while placing the thumb on the finger switch 150 as shown in FIG. 9. The flashlight grip employed in FIG. 9 may provide solid retention of the flashlight 100, and is generally appropriate for illumination of objects. Additionally, this flashlight grip allows the user to employ the flashlight 100 as a punching-based impact weapon, utilizing the alignment feature 140 as a striking surface, as shown in FIG. 18.

In the event that the user identifies a threat, the user may wish to use the flashlight 100 in conjunction with a handgun 400. FIGS. 10-14 show a method of transitioning the flashlight 100 to an alternate grip orientation that facilitates the use of a normal, two-handed handgun grip while illuminating the target, in accordance with some embodiments.

Figure 10:
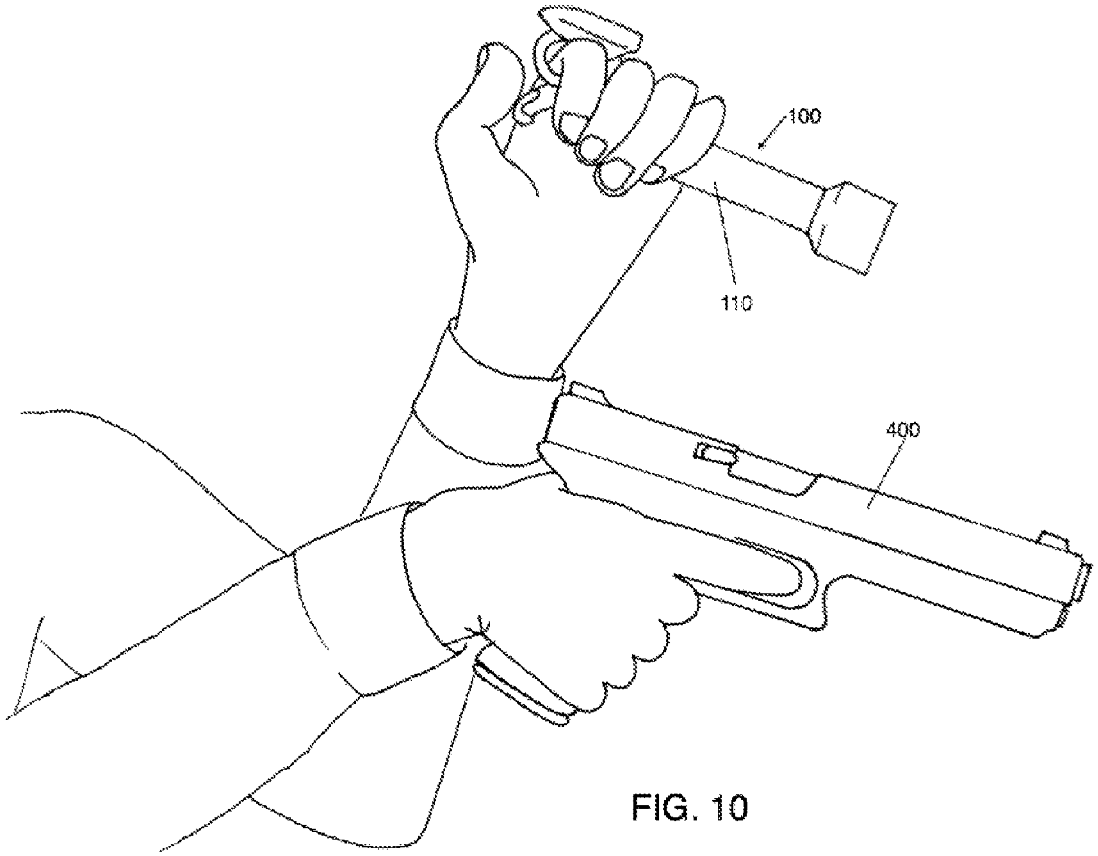
Figure 11:
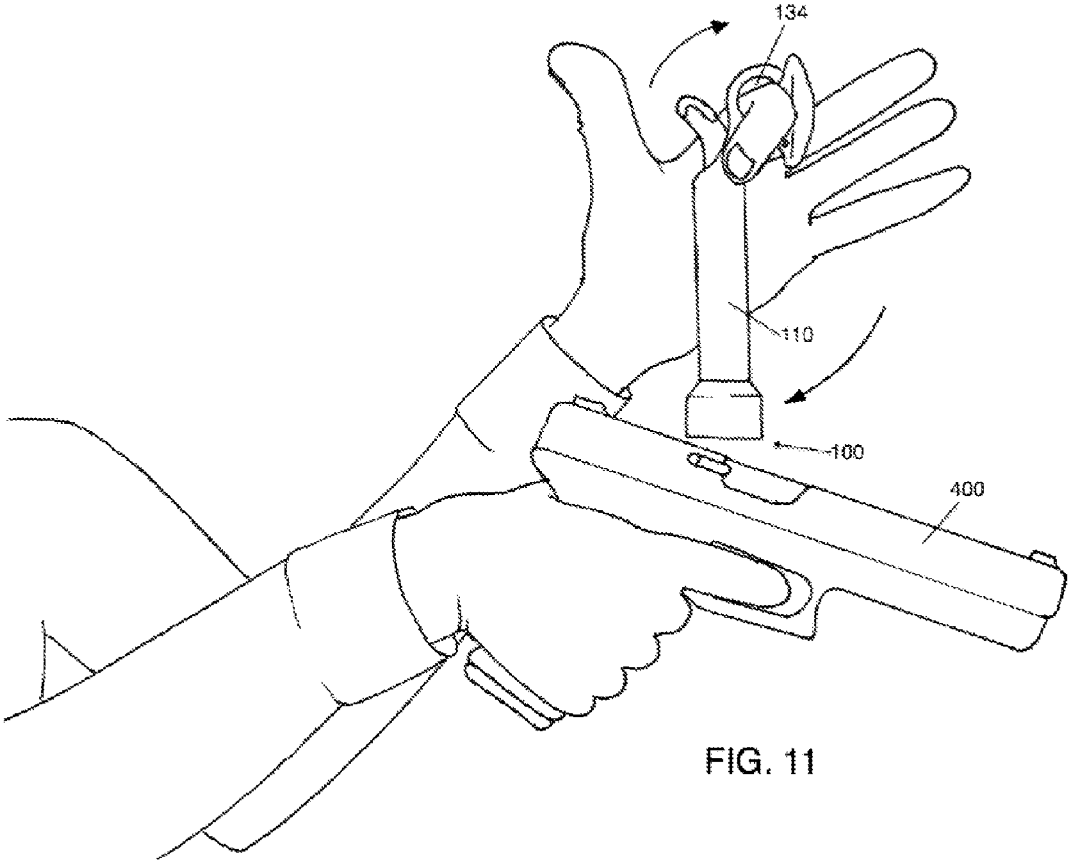
Figure 12:
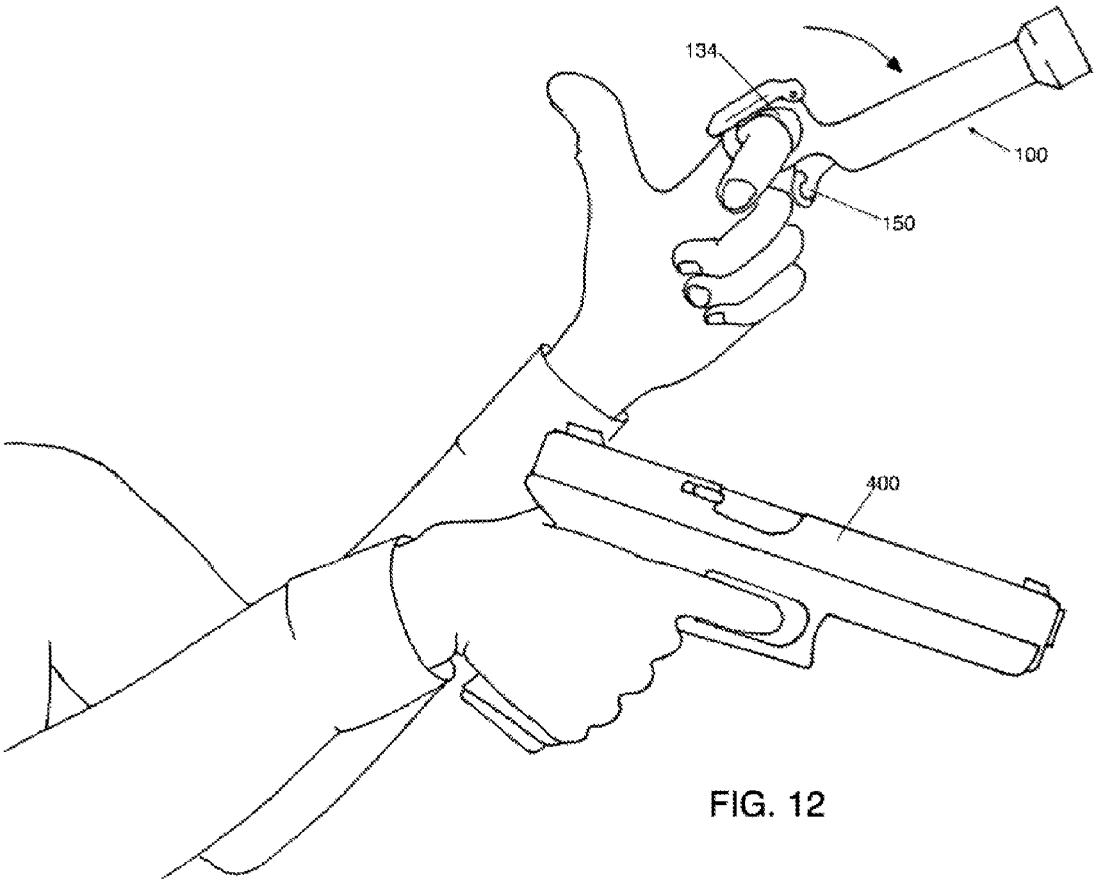
Figure 13:
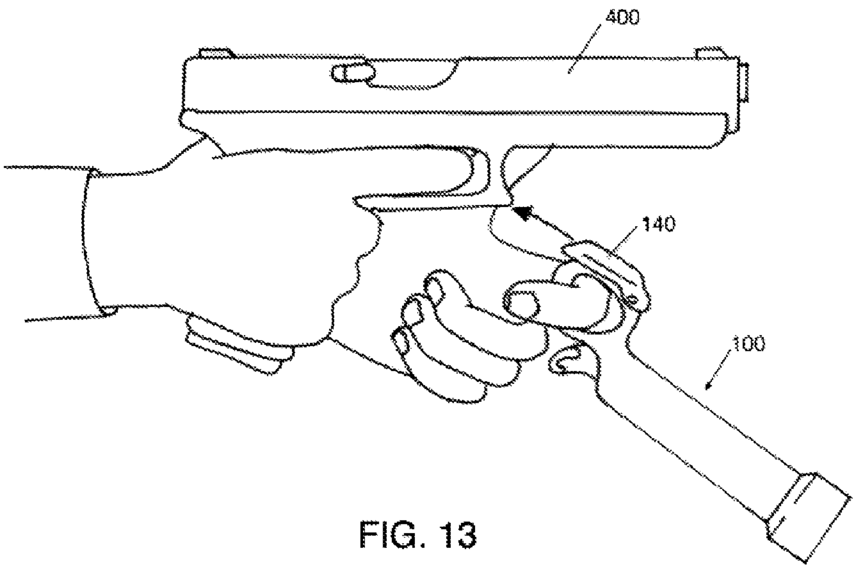
Figure 14:
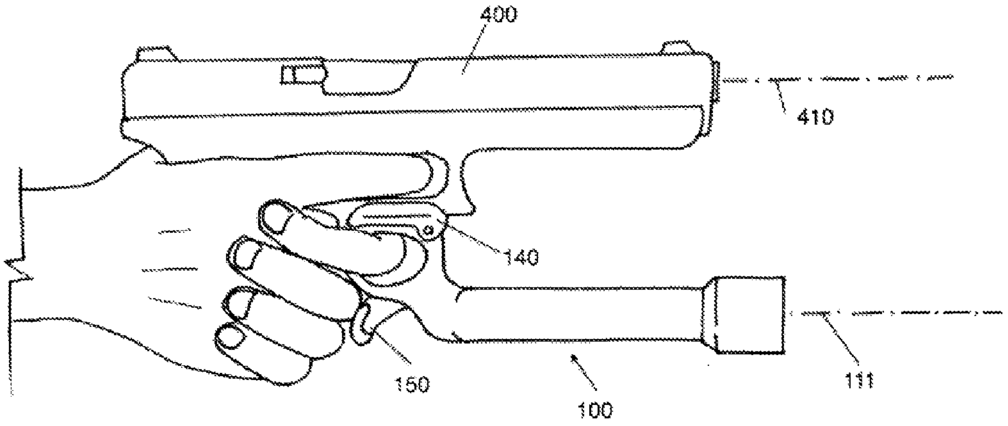
Figure 15:
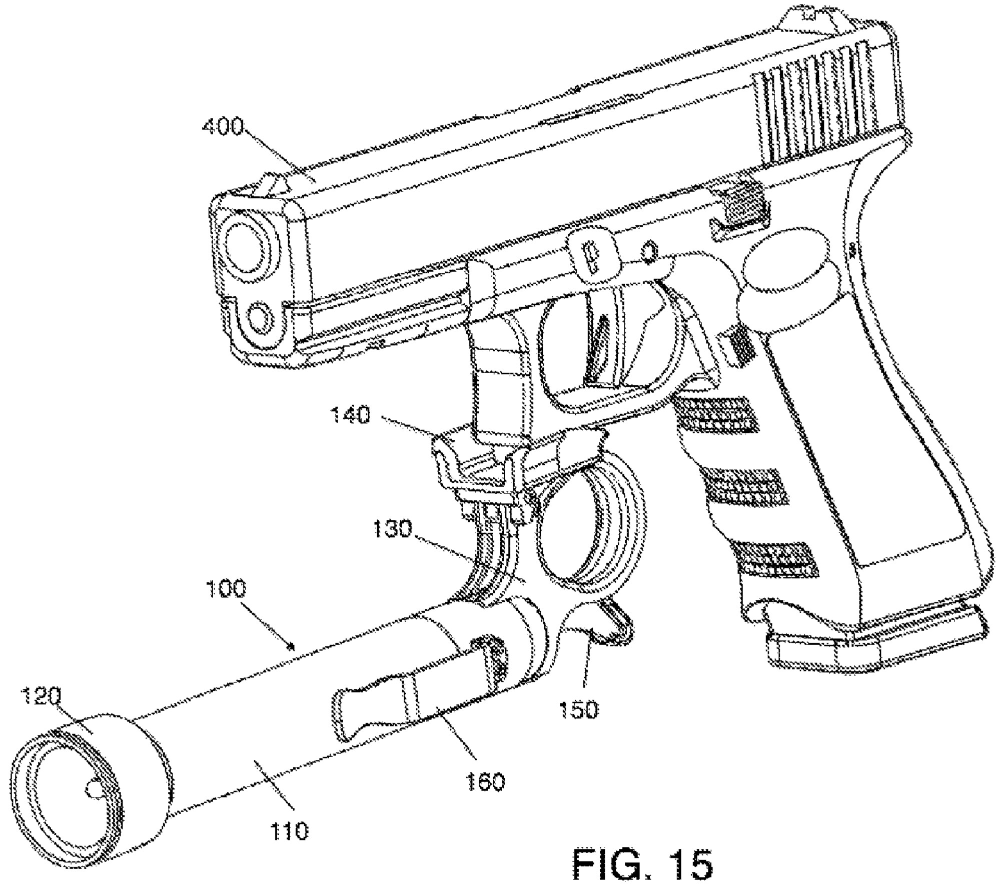
FIG. 15 shows a perspective view of a handgun and a flashlight in accordance with one or more embodiments.

In FIG. 10, the flashlight 100 and handgun 400 are being employed separately. Upon initiation of the grip transition, the user may release the middle, ring, and pinky finger from the tubular body 110, and may rotate the flashlight 100 around the index finger which remains engaged in the opening 134 as shown in FIG. 11. By rotating the hand forward and downward, the flashlight 100 can be further rotated round the index finger until a trigger of the finger switch 150 rests on the back of the middle finger as shown in FIG. 12. The left and right hands are then brought together as shown in FIG. 13 to bring the alignment feature 140 in proximity to the trigger guard before finally obtaining the normal two-handed firing grip as shown in FIG. 14. Once the two-handed firing grip has been established, the user can switch the light on and off by respectively squeezing and releasing the left hand. The squeezing action forces the alignment feature 140 to slideably engage with the trigger guard of the handgun 400, thereby rigidly attaching the flashlight 100 to the handgun 400. Further, the squeezing action may also cause the finger switch 150 to be depressed by the back of the user's middle finger, thereby causing the flashlight to be activated. Note that, in some embodiments, the flashlight is activated automatically by the squeezing action, and thus does not require the user to perform a separate action to turn on the flashlight (e.g., press the finger switch 150 using a fingertip). Note also that, when attached, the bore axis 410 of the handgun 400 is substantially aligned with the longitudinal axis 111 of the flashlight 100. For additional clarity, FIG. 15 shows a perspective view of a handgun and flashlight oriented as in FIG. 14 but with the users hands removed.

Figure 32:
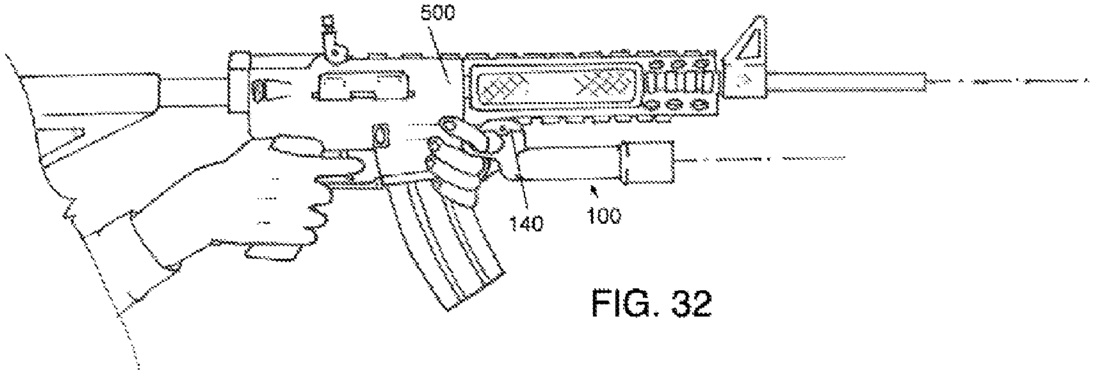
FIG. 32 shows a side view of a rifle and a flashlight in accordance with one or more embodiments.

FIG. 32 shows a grip alignment for the flashlight 100 when used with a rifle 500, in accordance with some embodiments. In some embodiments, the method of attaching the flashlight 100 to the rifle 500 may be similar to that described above with reference to the handgun 400. Note that, in some embodiments, the alignment feature 140 of the flashlight 100 may be rigidly attached to the lower rail of the fore-end of the rifle 500, thus aligning the beam axis of the flashlight 100 with the bore axis and/or sights of the rifle 500.

Figure 16:
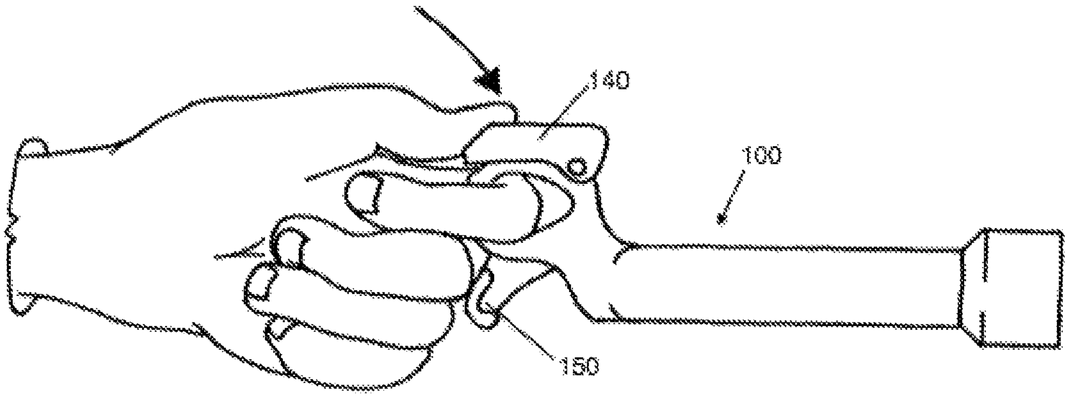
FIGS. 16-18 show examples to illustrate one or more embodiments.

Referring to FIG. 16, in some embodiments, the flashlight 100 may be gripped for use alone (i.e., separate from a firearm) by pressing the thumb downward against the alignment feature 140, thereby causes the finger switch 150 to be depressed by the back of the middle finger. This grip may also allow faster re-alignment with a firearm since the grip repositioning sequence described with reference to FIGS. 10-14 may not be necessary. This grip may also be obtained initially when the flashlight is being deployed from a pocket, belt, or similar.

Figure 17:
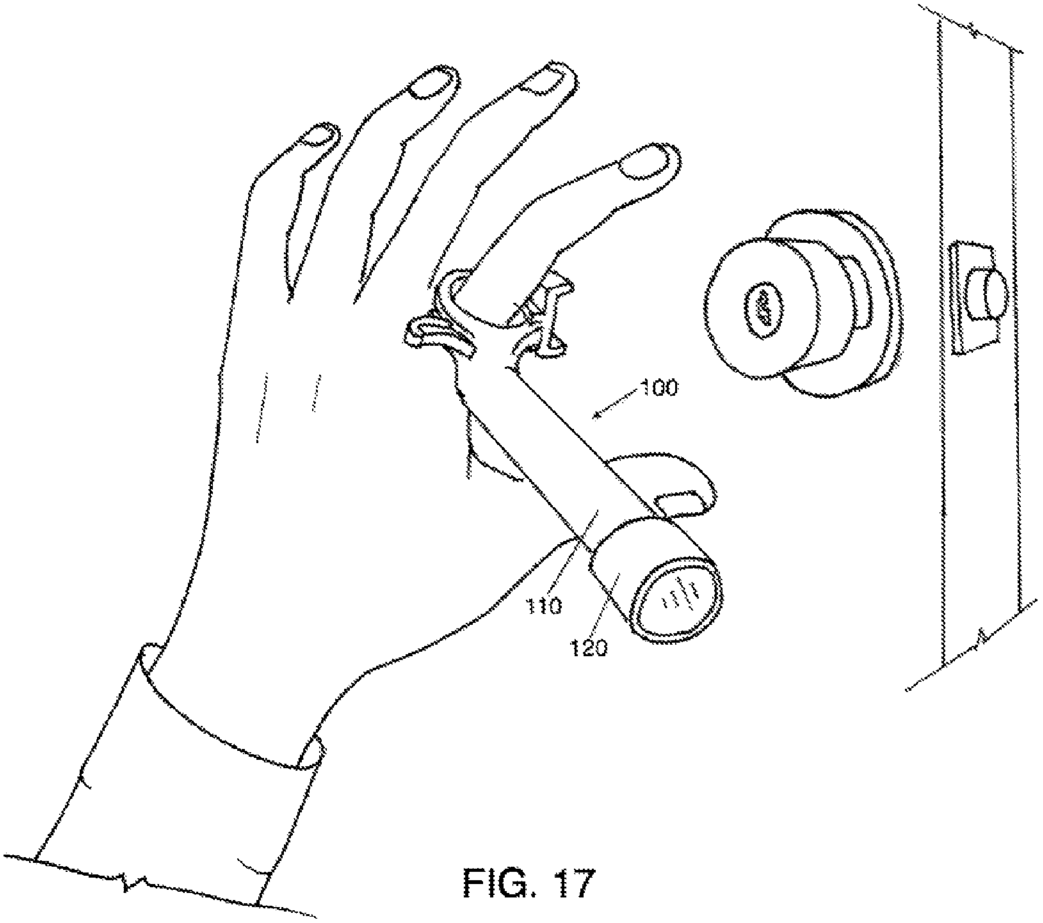

Referring to FIG. 17, in some embodiments, the flashlight 100 may be rotated around the index finger such that the tubular body 110 and lamp assembly 120 lay across the thumb. This allows for manipulation of objects while still holding the flashlight 100. Though FIG. 17 shows the user engaging a doorknob, there are many other potential interactions made possible by this retention method. In tactical situations, the grip shown in FIG. 17 can allow the user to manipulate a handgun's slide to clear a malfunctioning cartridge, reload the handgun by exchanging magazines and many other functions as known by those skilled in the art.

In one or more embodiments, a method may include providing a flashlight including an offset finger rotation housing. The offset finger rotation housing may be to enable rotation of the provided flashlight around at least one finger. The flashlight may be provided including a finger switch disposed on the offset finger rotation housing. The flashlight may be provided including an attachment feature to removably attach to a firearm. The attachment feature may be disposed on the offset finger rotation housing. The attachment feature may be to align the flashlight to the firearm.

In one or more embodiments, a method may include providing a flashlight accessory including an offset finger rotation housing and a flashlight connector. The offset finger rotation housing may be to enable rotation of the provided flashlight accessory around at least one finger. The flashlight accessory may be provided including a finger switch disposed on the offset finger rotation housing. The flashlight accessory may be provided including an attachment feature to removably attach to a firearm. The attachment feature may be disposed on the offset finger rotation housing. The attachment feature may be to align the flashlight accessory to the firearm.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A flashlight accessory comprising:

a connection collar to removably attach to a flashlight, wherein the flashlight comprises a tubular body having a longitudinal axis, wherein a distal portion of the flashlight includes a lamp assembly, wherein a proximal portion of the flashlight includes a tail cap switch to activate the flashlight, wherein the connection collar includes a substantially cylindrical inner surface to enclose at least some of the proximal portion of the flashlight; and a finger rotation loop comprising an opening configured to accept a first finger of a user, wherein the finger rotation loop further comprises a first portion substantially proximate to the longitudinal axis of the tubular body, wherein the first portion of the finger rotation loop is integrally attached to the cylindrical collar, wherein the finger rotation loop further comprises a second portion substantially distal to the longitudinal axis of the tubular body, wherein the second portion of the finger rotation loop comprises a protrusion extending outwardly from the finger rotation loop in a first direction, wherein the protrusion is configured to, when pressed by the thumb of the user, activate the flashlight by rotating the flashlight accessory around the first finger to apply pressure on the tail cap switch of the flashlight.

2. The flashlight accessory of claim 1, further comprising:

a raised shoulder disposed circumferentially on the inner surface of the connection collar.

3. The flashlight accessory of claim 1, further comprising:

a lever arm attached by a hinge to the finger rotation loop, wherein the lever arm is configured to activate the tail cap switch when pressed by the user.

4. The flashlight accessory of claim 1, wherein the finger rotation loop is offset from the longitudinal axis of the tubular body.

5. The flashlight accessory of claim 1, wherein the first direction is substantially perpendicular to the longitudinal axis of the tubular body.

6. The flashlight accessory of claim 5, wherein a central axis of the opening of the finger rotation loop is substantially perpendicular to both the first direction and the longitudinal axis of the tubular body.

7. The flashlight accessory of claim 1, wherein a diameter of the inner surface of the connection collar is greater than a diameter of the tubular body of the flashlight.

8. The flashlight accessory of claim 1, wherein the connection collar is to removably attach to the flashlight without using a friction fit.

9. The flashlight accessory of claim 3, wherein a rotational axis of the lever arm is substantially perpendicular to the longitudinal axis of the tubular body.

10. The flashlight accessory of claim 1, further comprising an attachment feature, disposed on the finger rotation loop, to removably attach the flashlight to a firearm.

11. The flashlight accessory of claim 1, wherein an axial length of the inner surface of the connection collar is greater than a radius of the inner surface of the connection collar.

12. The flashlight accessory of claim 10, wherein the attachment feature comprises at least one magnet.

13. A flashlight accessory comprising:

a flashlight connector collar to removably attach to a flashlight, wherein the flashlight comprises a tubular body having a longitudinal axis, wherein a proximal portion of the flashlight includes a tail cap switch to activate the flashlight, wherein the connection collar includes a substantially cylindrical inner surface to enclose at least some of the proximal portion of the flashlight;

a finger rotation loop comprising an opening configured to accept a first finger of a user, wherein the flashlight connect collar is integrally attached to a first portion of the finger rotation loop; and a protrusion extending outwardly from the finger rotation loop, wherein the protrusion is integrally attached to a second portion of the finger rotation loop, wherein the protrusion is configured to, when pressed by the user, activate the flashlight by rotating the flashlight accessory around the first finger of the user.

14. The flashlight accessory of claim 13, wherein the finger rotation loop further comprises an attachment feature to removably attach the flashlight to a firearm.

15. The flashlight accessory of claim 14, wherein the attachment feature is to align an aim of the flashlight to an aim of the firearm.

16. The flashlight accessory of claim 14, wherein the attachment feature comprises at least one slide coupler.

17. The flashlight accessory of claim 13, wherein an axial length of the inner surface of the flashlight connector collar is greater than a radius of the inner surface of the flashlight connector collar.

18. The flashlight accessory of claim 13, further comprising a raised shoulder disposed circumferentially on the inner surface of the flashlight connector collar.

19. The flashlight accessory of claim 13, wherein the first portion of the finger rotation loop is substantially proximate to the longitudinal axis of the tubular body, and wherein the second portion of the finger rotation loop is substantially distal to the longitudinal axis of the tubular body.

20. The flashlight accessory of claim 15, wherein the protrusion is configured to, when pressed by a thumb of the user, activate the flashlight by pressing the tail cap switch.

21. A flashlight, comprising:

a tubular body having a distal portion and a proximal portion;

a lamp assembly disposed on the distal portion; and an offset finger rotation housing disposed on the proximal portion, wherein the offset finger rotation housing comprises a switch to control the lamp assembly, wherein the offset finger rotation housing further comprises an opening configured to accept a first finger of a user, wherein the offset finger rotation housing further comprises a first portion substantially proximate to a longitudinal axis of the tubular body, wherein the first portion of the offset finger rotation housing is integrally attached to the tubular body of the flashlight, wherein the offset finger rotation housing further comprises a second portion substantially distal to the longitudinal axis of the tubular body, wherein the second portion comprises the switch having a protrusion extending outwardly from the offset finger rotation housing, wherein the protrusion is configured to, when pressed by a thumb of the user, control the lamp assembly by rotating the flashlight around the first finger to press the switch against a tail cap switch of the flashlight.

22. The method flashlight of claim 21, wherein the proximal portion comprises an end cap, and wherein the offset finger rotation housing is integrally attached to the end cap.

23. The flashlight of claim 21, wherein the switch comprises a lever arm attached by a hinge to the offset finger rotation housing.

24. The flashlight of claim 21, further comprising an attachment feature, disposed on the offset finger rotation housing, to removably attach the flashlight to a firearm.

25. The flashlight of claim 24, wherein the attachment feature comprises at least one magnet.

26. The flashlight of claim 24, wherein the attachment feature is to align the flashlight to the firearm.

* * * * *